US010791432B2

United States Patent
Böck et al.

(10) Patent No.: US 10,791,432 B2
(45) Date of Patent: Sep. 29, 2020

(54) COMMUNICATION SYSTEM OF A RESCUE VEHICLE

(71) Applicant: IVECO MAGIRUS AG, Ulm (DE)

(72) Inventors: Gotthard Böck, Neu Ulm (DE); Martin Karremann, Burgrieden (DE)

(73) Assignee: IVECO MAGIRUS AG, Ulm (DE)

( * ) Notice: Subject to any disclaimer, the term of this patent is extended or adjusted under 35 U.S.C. 154(b) by 0 days.

(21) Appl. No.: 16/069,974

(22) PCT Filed: Feb. 6, 2017

(86) PCT No.: PCT/IB2017/050634
§ 371 (c)(1),
(2) Date: Jul. 13, 2018

(87) PCT Pub. No.: WO2017/134638
PCT Pub. Date: Aug. 10, 2017

(65) Prior Publication Data
US 2019/0037365 A1 Jan. 31, 2019

(30) Foreign Application Priority Data
Feb. 5, 2016 (IT) .......... 102016000012297

(51) Int. Cl.
*H04W 12/12* (2009.01)
*H04W 4/10* (2009.01)
*H04L 12/701* (2013.01)
*H04L 12/40* (2006.01)
*H04L 29/06* (2006.01)

(52) U.S. Cl.
CPC ......... *H04W 4/10* (2013.01); *H04L 12/40006* (2013.01); *H04L 45/00* (2013.01); *H04L 69/08* (2013.01); *H04L 2012/40215* (2013.01); *H04L 2012/40273* (2013.01)

(58) Field of Classification Search
CPC .. H04W 4/10; H04L 12/400067; H04L 45/00; H04L 69/08
See application file for complete search history.

(56) References Cited

U.S. PATENT DOCUMENTS

| | | | | |
|---|---|---|---|---|
| 9,848,311 | B1* | 12/2017 | Grier | H04W 16/26 |
| 2002/0163215 | A1* | 11/2002 | Emerling | B60N 3/101 |
| | | | | 296/24.34 |
| 2003/0051131 | A1* | 3/2003 | Reinold | H04L 45/00 |
| | | | | 713/153 |
| 2003/0081796 | A1* | 5/2003 | Bray | H04B 1/20 |
| | | | | 381/86 |

(Continued)

OTHER PUBLICATIONS

Cisco Mobile Network Solutions for Public Safety, White Paper, Mar. 2008 (Year: 2008).*

(Continued)

*Primary Examiner* — Dong-Chang Shiue
(74) *Attorney, Agent, or Firm* — Stetina Brunda Garred and Brucker

(57) ABSTRACT

Communication system of a rescue vehicle, comprising a plurality of speech input channels and a plurality of speech output channels, and an interface router connecting the plurality of speech input channels and the plurality of speech output channels in a way that each of the plurality of speech input channels can be linked to communicate with a plurality of the speech output channels at the same time.

22 Claims, 2 Drawing Sheets

(56) References Cited

U.S. PATENT DOCUMENTS

2004/0130616 A1\* 7/2004 Tseng .................. B60R 11/0211
 348/61
2007/0127734 A1\* 6/2007 Brulle-Drews ........ H04B 1/207
 381/86

OTHER PUBLICATIONS

Cisco, Cisco Mobile Network Solutions for Public Safety, Apr. 8, 2008, pp. 1-7, <http://www.cisco.com/c/en/us/products/collateral/routers/3200-series-rugged-integrated-services-routers-isr/prod_white_paper0900aecd806220af.pdf> [retrieved on Sep. 28, 2016].

Kim Jin Ho et al., Gateway Framework for in-Vehicle Networks Based on CAN, FlexRay, and Ethernet, IEEE Transactions on Vehicular Technology, vol. 64, No. 10, Oct. 1, 2015, pp. 4472-4486 [retrieved on Oct. 13, 2015].

Patent Cooperation Treaty, International Search Report and Written Opinion for International Application No. PCT/IB2017/050634, dated Apr. 4, 2017, 16 pages.

\* cited by examiner

COMMUNICATION SYSTEM OF A RESCUE VEHICLE

CROSS-REFERENCE TO RELATED APPLICATIONS

The present application claims priority to PCT International Application No. PCT/IB2017/050634 filed on Feb. 6, 2017, which application claims priority to Italian Patent Application No. 102016000012297 filed Feb. 5, 2016, the entirety of the disclosures of which are expressly incorporated herein by reference.

STATEMENT RE: FEDERALLY SPONSORED RESEARCH/DEVELOPMENT

Not Applicable

TECHNICAL FIELD

The present invention refers to a communication system of a rescue vehicle.

BACKGROUND ART

Rescue vehicles, such as fire fighting vehicles, are equipped with an internal communication system enabling a communication between different participants operating at different locations at or around the vehicle. For example, different operating stands can be connected to communicate with each other, such as the driver's cabin of the vehicle and the main operation stand, the operation stand of a turnable ladder, or a pump operation stand, etc.

In common rescue vehicles, it is possible to connect each one of the different communication sources as transmitters with one selected receiver via a communication channel at the same time. This means that the communication channels operate on a one-to-one basis, i.e. an established connection between one transmitter and one receiver excludes other receivers. In many situations it is desired to address more than one receiver, for example, different operator stands (pump, ladder) from one (main) operator stand, or to establish free communication between all participants of a group of transmitters and receivers, such that all operator stands can communicate with each other at the same time. Participants not belonging to an operator stand but involved in the communication within a rescue operation can also be included in this group. Moreover, in some situations it is desired to send calling signals or warning signals within the communication system to one or more receivers. There is no known communication system that provides these options with full flexibility in addressing an arbitrary number of receivers, managing the complete audio communication of the rescue vehicle.

DISCLOSURE OF INVENTION

It is therefore an object of the present invention to provide a communication system of a rescue vehicle that is able to connect many different transmitters to different receivers, giving more flexibility than a simple one-to-one connection between transmitter and receiver, and also providing more options with respect to the signals to be transmitted. A particular object is to enable a communication between many different transmitters and receivers in a way that different transmitters and receivers can communicate with each other without excluding other transmitters and receivers, such that more than one receiver can be addressed by a transmitter, and/or more than one transmitter can address the same receiver (or a plurality of receivers) at the same time.

These objects are achieved by a communication system comprising the features of claim 1.

The communication system according to the present invention comprises a plurality of speech input channels and a plurality of speech output channels. For connecting the input channels with the output channels, an interface router is provided that operates in a way that each of the input channels can be linked to communicate with a plurality of the output channels. Each input channel may correspond to one communication source, or transmitter, as described above. Communication information or content issued by the transmitter is transmitted via one input channel to the interface router, to be routed to one or more output channels. Unlike in communication systems which are commonly known in rescue vehicles, this routing of communication content is fully flexible in a way that communication content can be transmitted from one input channel to as many output channels as desired, which are connected to the interface router. With other words, many receivers can be addressed by one transmitter via the interface router at the same time. In the same way, many transmitters can address one (or more) receiver(s) via the interface router at the same time. The communication between the input channel and output channel does not exclude another input/output channel.

The different input channels and output channels may correspond to different operator stands of a rescue vehicle but may also include signal sources or generators into the system, to transmit a warning signal or calling signal to a number of different output channels at the same time, or voice message sources for pre-fabricated voice messages stored in a memory. Moreover, the input channels and output channels can include such that are not physically part of the rescue vehicle but connected to it and involved in its communication system.

Due of the flexibility of the interface router according to the present invention, many other options are possible that shall be described in the following.

According to one preferred embodiment of the present invention, one or more of the input channels comprises a microphone as a speech input source, with different microphones being located at different operator stands of the rescue vehicle.

More preferably, each of the input channels comprises a preamplifier to preamplify analog signals and an analog/digital (A/D) converter to convert preamplified analog signals issued from the preamplifier to be input into the interface router.

According to another preferred embodiment of the present invention, each of the input channels and output channels operates in a particular signal transmission mode, and the interface router is configured to connect the plurality of input channels and the plurality of output channels irrespective of the compatibility between the respective signal transmission modes of the input channel and the output channel. For example, the plurality of input channels may comprise a radio frequency input channel, a telephone signal transmission input channel, an internet protocol input channel, or the like. In the same way, the plurality of output channels may comprise different kinds of output channels. Routing is possible by linking, for example, a radio frequency input channel to a telephone signal transmission protocol output channel, or to an internal wire bound communication channel of the vehicle, or the like. An arbitrary combination of input channels with output channels of different kind is possible within the interface router. This provides an extensive flexibility of the communication system according to the present invention.

According to one preferred embodiment of the present invention, the transmission mode is a signal transmission protocol for coding/encoding signal data. This means that the transmission protocols of the transmitter and the receiver may not necessarily be identical, and the interface router may represent a link for the transfer between different signal transmission protocols.

According to another preferred embodiment, the transmission mode is related either to analog signal transmission or to digital signal transmission. For example, the input channel may be an analog signal transmission channel, while the output channel may be a digital signal transmission, or vice versa.

According to another preferred embodiment of the present invention, the transmission mode is related to a communication hardware signal transmission channel. For example, the input channel is a wireless input channel, such as a radio frequency input channel, while the output channel is a wire-bound communication channel.

The transmission mode is preferably related to internal vehicle communication or external vehicle communication. For example, the input channel is an external channel, like a telephone channel connecting a telephone transmitter to a vehicle, while the output channel belongs to internal vehicle communication.

Preferably, the interface router is a programmable integrated circuit. This can be, for example, a field programmable gate array (FPGA) or a digital signal processor (DSP). This provides a high flexibility of programming the interface router to a adapt it to different input channels or output channels.

More preferably the interface router is connected to an internal communication bus system of the vehicle. According to one example, this can the a CAN bus of the rescue vehicle.

According to another preferred embodiment of the present invention, the communication system further comprises a microcontroller for controlling the interface router.

More preferably, the microcontroller is connected to the internal bus system for receiving control commands transmitted via the internal bus system.

According to another preferred embodiment of the present invention, the communication system comprises control command generation means connected to the internal bus system, with different control command generation means being located at different operator stands of the rescue vehicle.

Preferably the control command generation means comprise at least one selection key for selecting one or more of the plurality of output channels. This selection key can be a hardkey or a softkey. Moreover, a talk button as another command key can be comprised within the command generation means to control the opening or closing of a specific input channel.

More preferably, the microcontroller is provided for controlling the preamplifiers of the speech input channels.

Even more preferably, the communication system according to the present invention further comprises a memory for storing messages, connected to the output channels by the interface router such that a message stored in the memory can be output via one or more output channels. This message can be, for example, a pre-fabricated voice message.

More preferably, the communication system according to the present invention further comprises a memory for recording and storing communication content exchanged via the interface router.

More preferably, the communication system according to the present invention further comprises a signal generator connected to the output channels by the interface router such that a signal generated by the signal generator can be output via one or more output channels. These signals may be, for example, warning signals or calling signals to be addressed to a plurality of receivers via the output channels.

According to another preferred embodiment, the communication system further comprises noise cancellation means for cancelling a noise content within the communication content exchanged via the interface router.

Preferably each of the input channels is chosen from the following group: a radio transmission channel on a determined radio transmission frequency or frequency band; a telephone transmission channel; a vehicle internal communication channel; a vehicle external communication channel; an internet protocol transmission channel; wherein each of the above group may be a wire-bound or wireless channel.

More preferably, each of the input channels each of the output channels is chosen from the following group: a radio transmission channel on a determined radio transmission frequency or frequency band; a telephone transmission channel; a vehicle internal communication channel; a vehicle external communication channel; an internet protocol transmission channel; wherein each of the above group may be a wire-bound or wireless channel.

More preferably, at least one of the output channels comprises an interface for connecting an external radio transmission apparatus to the interface router.

The present invention will be elucidated more clearly with respect to a preferred embodiment of the present invention, which will be described hereinafter by means of the following figures.

BRIEF DESCRIPTION OF THE DRAWINGS

According to another preferred embodiment, at least one of the input channels comprises an interface for connecting an external radio transmission apparatus to the interface router.

BEST MODE FOR CARRYING OUT THE INVENTION

Figure 1:
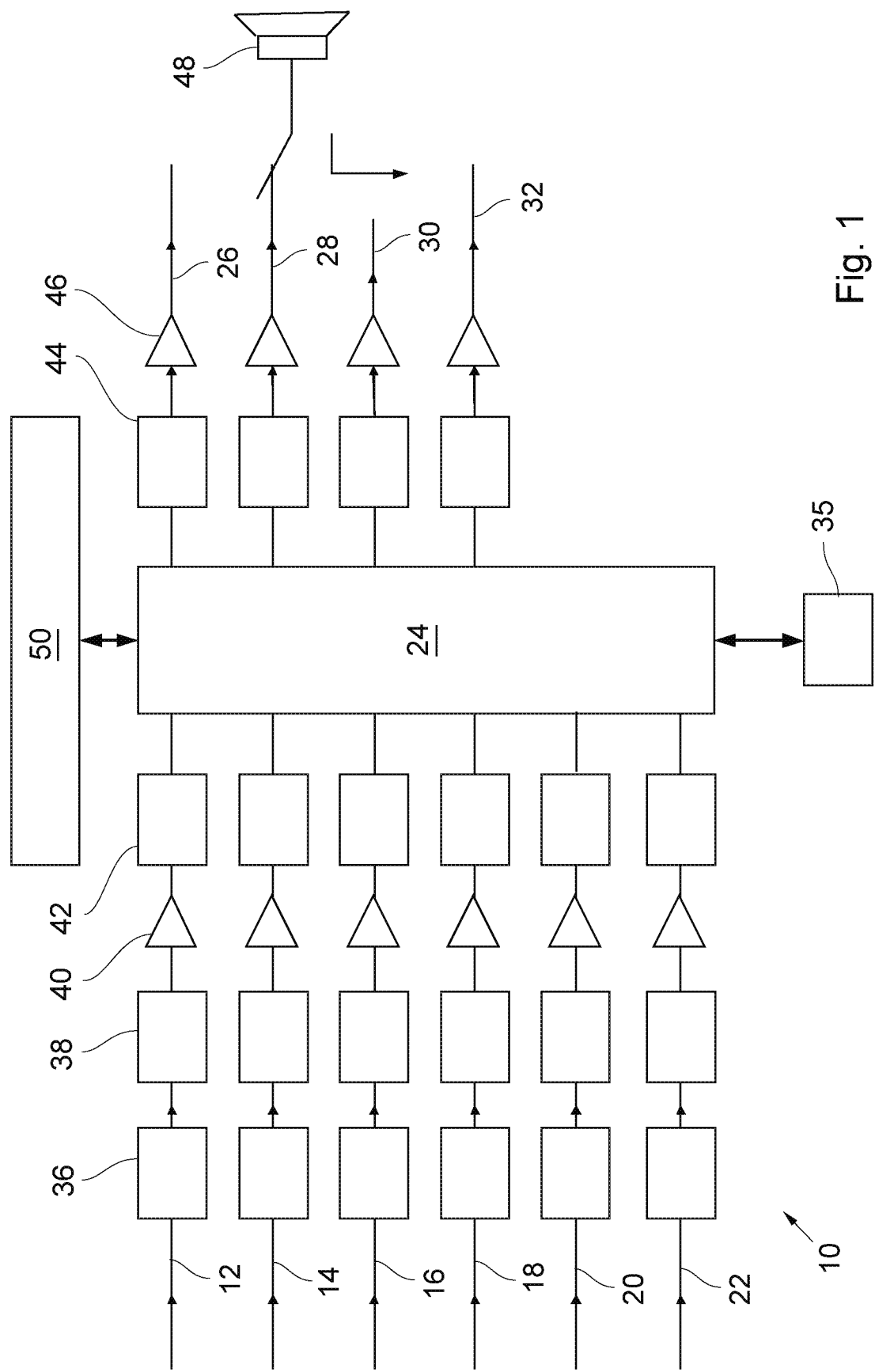
FIG. 1 is a schematic view of one embodiment of the communication system according to the present invention.

The schematic diagram in FIG. 1 shows a communication system 10 installed in a rescue vehicle, for example, in a firefighting vehicle. The communication system 10 comprises a plurality of input channels, namely input channels 12,14,16,18,20,22. Each input channel 12,14,16,18,20,22 corresponds to a communication source or transmitter outputting communication content or signals, which can be transmitted via the input channels 12,14,16,18,20,22. The input channels 12,14,16,18,20,22 are connected to an interface router 24, which is a programmable integrated circuit, like, for example, a field programmable gate array (FPGA). On the other hand, the interface router 24 is connected to a plurality of output channels 26,28,30,32 to connect the interface router 24 with a corresponding number of receivers. As a result, the input channels 12,14,16,18,20,22 are connected to the output channels 26,28,30,32 by the interface router 24.

Each of the plurality of input channels 12,14,16,18,20,22 can be linked by the interface router 24 to any one or to a plurality of the output channels 26,28,30,32 to communicate to at least one or to a plurality of output channels 26,28,30, 32, such that communication content or signals can be transmitted from the input channels 12,14,16,18,20,22 to the output channel 26,28,30,32. That is, a link or connection between one or more input channels 12,14,16,18,20,22 and one or more output channels 26,28,30,32 can be established at the same time by the interface router 24. In the present embodiment, the interface router 24 is connected to an internal communication bus system 35 (for example, a CAN bus or Ethernet) of the rescue vehicle.

The input channels 12,14,16,18,20,22 can be of different kind, that is, they may use different ways of transmission, like analog or digital signal transmission, or different signal transmission protocols, or may be different with respect to the transmission hardware, for example, wireless or wirebound hardware transmission. Moreover, the input channels 12,14,16,18,20,22 may be part of the internal vehicle communication, meaning that the respective input channel 12,14,16,18,20,22 is comprised within the vehicle. However, each of the input channels 12,14,16,18,20,22 may be an external vehicle communication channel, by which the input source or transmitter is not part of the vehicle but is able to be linked to the internal vehicle communication via the respective input channel.

In the same way, the different output channels 26,28,30,32 may be different with respect to their transmission mode, i.e. a signal transmission protocol for coding/encoding signal data, with respect to analog or digital signal transmission, with respect to the hardware underlying the transmission, or with respect to internal or external vehicle communication.

As a result, the different input channels 12,14,16,18,20,22 may use different transmission modes which are not necessarily compatible to each other. In the same way, the different output channels 26,28,30,32 may also use different transmission modes which are not compatible to each other. Moreover, according to the present invention, the interface router 24 is able to link each of the input channels 12,14, 16,18,20,22 to each of the output channels 26,28,30,32, or to a plurality of output channels 26,28,30,32 at the same time, irrespective of any compatibility between the input channel 12,14,16,18,20,22 and output channels 26,28,30,32 to be linked. With other words, the interface router 24 is able to link any input channels 12,14,16,18,20,22 to any output channels 26,28,30,32 also in cases in which a direct signal transmission from the respective input channel and the respective output channel would not be possible in a direct connection.

Just to give one example, the first input channel 12 may be a radio frequency transmission input channel from an external transmitter, which is not part of internal vehicle communication. These radio transmission signals will be input into the interface router 24, which links the first input channel 12 to an output channel, for example, a first output channel 26, which is not a radio transmission channel but a wire-bound internal vehicle communication channel. In another example, this first input channel 12 may be linked to two different output channels, maybe the first output channel 26 as described above, and a second output channel 28 which may use a transmission mode different from the first output channel 26, for example, a different signal transmission protocol. The interface router 24 is able to handle all transmission modes involved in the input channels 12,14, 16,18,20,22 and the output channels 26,28,30,32 of the communication system 10 of this embodiment.

Each of the input channels 12,14,16,18,20,22 comprises a speech filter device or SFD 36, an anti aliasing low pass filter 38 to filter the signals from the SFD 36, a preamplifier 40 and an A/D converter 42 to convert analog signals issued from the preamplifier 40 to digital signals to be input into the interface router 24.

Each of the output channels 26,28,30,32 comprises a D/A converter 44, to convert digital signals from the interface router 24 into analog signals, and an amplifier 46 to amplify the analog signals from the D/A converter 44. Just as one example for an output unit, a loudspeaker 48 is shown in the figure to transduce the signals from the amplifier 46 into audio signals.

The communication system 10 further comprises a memory 50 for recording and storing communication content exchange via the interface router 24. That is, signals input from and input channel 12,14,16,18,20,22 into the router 24 are not only routed to one or more output channels 26,28,30,32, as described above, but they are also stored within the memory 50 so that they can be read out of the memory 50 at a later point of time, for example, after termination of a rescue operation to analyze and reconstruct the communication during the rescue operation.

Moreover, the communication system 10 may comprise a signal generator connected to the output channels 26,28,30, 32 by the interface router 24 such that a signal generated by the signal generator can be output via one or more output channels 26,28,30,32. Such a signal may be, for example, a warning signal generated automatically from the vehicle, for example, by a collision warning system. It may be provided that a signal generated by the signal generator has priority over any other input channel 12,14,16,18,20,22, in particular any other input channel transmitting speech signals. In another example, a memory for storing prefabricated voice messages can be provided.

The communication system 10 may further comprise a noise cancellation means or device for cancelling a noise content within the communication content exchange via the interface router 24.

In the rescue vehicle comprising the communication system 10 according to this embodiment, the input channels 12,14,16,18,20,22 may correspond to different transmitters or communication sources involved in a rescue operation. In particular, at least some of the input channels 12,14,16,18, 20,22 may correspond to input sources at different operation stands of the rescue vehicle, for example, a main operator stand of a fire fighting vehicle, a turnable ladder operator stand, a driver's cabin, a pump operator stand, or the like. In the same way, at least some of the output channels 26,28, 30,32 may connect the interface router to different receivers corresponding to the different operator stands of a rescue vehicle, as described before in connection with the output channels. Remaining input channels 12,14,16,18,20,22 and/or output channels 26,28,30,32 may correspond to external transmitters and receivers not located at the vehicle but involved in the rescue operation, to communicate with the operator stands at the vehicle. The communication system 10 provides a flexible communication between all operator stands of the rescue vehicle, also involving signal sources and operators which are not part of the vehicle or operating with the vehicle. A communication between different rescue vehicles, which comprising a communication system 10 of this embodiment, is also possible.

In a practical situation, the microphone at a main operator stand may correspond to one input channel, for example, the input channel marked by reference number 12, while different output channels 26,28,30 correspond to the turnable ladder operator stand, the driver's cabin, and the pump operator stand, respectively. From the main operator stand, the turnable ladder operator stand, the driver's cabin and the pump operator stand can be addressed at the same time from the main operator stand, for example, by pressing a microphone switch. Selecting the different output channels 26,28, 30 can be performed at the main operator stand before operating the microphone. The audio input signals that are input into the microphone are transmitted by the router 24 to the selected output channels, respectively. In the same way, it is possible to address the main operator stand from all other operator stands, for example, the turnable ladder operator stand, the driver's cabin, and the pump operator stand at the same time, without excluding the channels. In this case the audio signals from the turnable ladder operator stand, the driver's cabin and the pump operator stand are mixed within the router 24 to be output to the main operator stand. It is noted that the above description is just an example for the communication between different input and output channels, or different operator stands. As described above, a warning signal can be generated according to an operation from the main operator stand, and this warning signal is transmitted to one or a plurality of output channels. This warning signal can also be mixed with other audio signals routed by the router 24 to the output channels.

In the communication system 10 according to the present invention, the router 24 manages the complete audio communication in and around the rescue vehicle, including speech communication between different operator stands and other parties involved in a rescue operation, and also managing different sound messages or warning signals.

Figure 2:
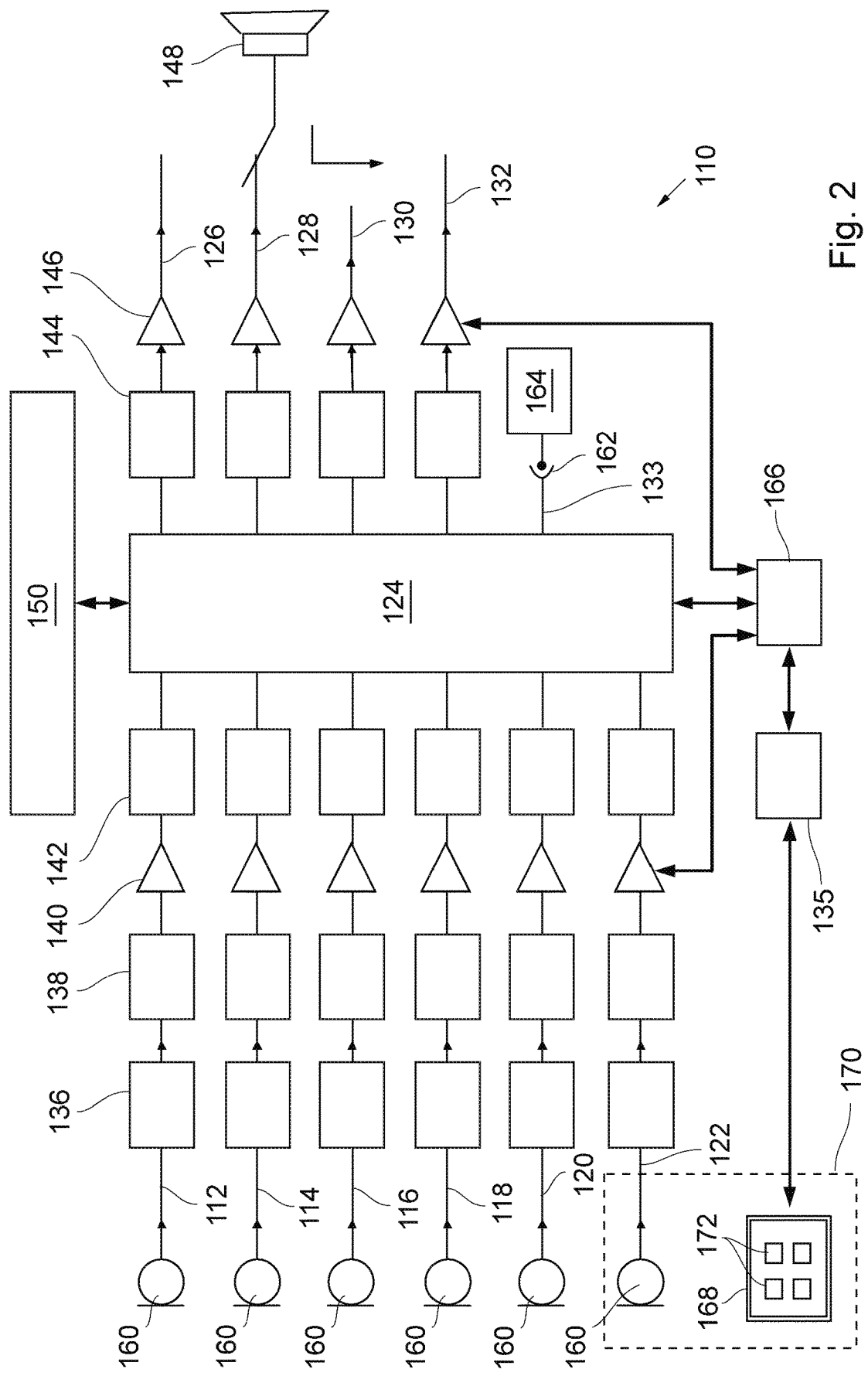
FIG. 2 is a schematic view of another embodiment of the communication system according to the present invention.

The schematic diagram in FIG. 2 shows another communication system 110 installed in a rescue vehicle, for example, in a firefighting vehicle. As the communication system 10 in the foregoing embodiment in FIG. 1, the communication system 110 comprises a plurality of input channels, which are speech input channels 112,114,116,118, 120,122 in the present case. Each speech input channel 112,114,116,118,120,122 corresponds to a communication source for transmitting a speech content to an interface router 124, which is a programmable integrated circuit, like, for example, a field programmable gate array (FPGA). On the other hand, this interface router 124 is connected to a plurality of output channels 126,128,130,132,133 to connect the interface router 124 with a corresponding number of receivers.

In the present embodiment, each of the input channels 112,114,116,118,120,122 comprises a microphone 160 as a speech input source, to convert speech into electric analog speech signals, which are input into a speech filter device or SFD 136. The output signal of the SFD 136 passes an anti aliasing filter 138 to filter the signals from the SFD 136. A preamplifier 40 is provided to preamplify the respective filtered signals of the low pass filters 138. The preamplified signals output from the preamplifiers 140 are converted into digital signals by a respective analog/digital (A/D) converter 142, which are input into the interface router 124.

Each of the output channels 126,128,130,132 comprises a digital/analog (D/A) converter 144, to convert digital signals output from the interface router 124 into analog signals, and an amplifier 146 to amplify the analog signals from the D/A converter 144. As one example for an output unit, a loudspeaker 148 is shown in FIG. 2, which transduces the signals from the amplifier 146 into audio signals.

Another output channel 133 shown in FIG. 2 comprises an interface 162 for connecting an external radio transmission apparatus 164 to the interface router 124. This external radio transmission apparatus 164 can be connected, if desired, to the interface 162, or disconnected from it when not in use. In a similar way, an input channel (not shown in FIG. 2) may comprise an external radio transmission apparatus 164 as a speech input source, to be connected to the interface router 124 via a respective interface comprised within the respective input channel.

A memory 150 is provided for recording and storing pre-fabricated speech messages to be input into the interface router 124. In the same way, a signal generator may be provided to the interface router 124 such that a signal generated by the signal generator can be directly input into the interface router 124.

Each of the input channels 112,114,116,118,120,122 can be linked to one or more of the output channels 126,128, 130,132,133 by means of the interface router 124. In particular it is possible to connect each one of the input channels 112,114,116,118,120,122 to a plurality of output channels 126,128,130,132,133 at the same time, to route a speech signal from one speech input source to a plurality of receivers. Generally it is possible to mix the speech input of a plurality of input channels 112,114,116,118,120,122 within the interface router 124 and to output the result to one output channel 126,128,130,132,133, or to a plurality of different output channels 126,128,130,132,133. Moreover, in this context it is also possible to mix a speech input of one of the input channels 112,114,116,118,120,122 with a synthesized signal generated by the signal generator, and/or with a voice message from the memory 50. Within this context the memory 150 and the signal generator can also be considered as input channels.

A microcontroller 166 is provided for controlling the interface router 124. This microcontroller 166 is connected to an internal bus system 135, for example, a CAN system of the vehicle, to receive commands transmitted via this internal bus system 135. Such control commands are generated by control command generation means connected to the internal bus system 135. In the present embodiment, these command generation means comprise touch screen devices 168 provided at different positions of the vehicle. Only one touch screen device 168 is exemplary shown in FIG. 2. In particular each touch screen device 168 is positioned at one operator stand 170 of the vehicle, together with one microphone 160 of a speech input channel 112, 114,116,118,120,122. On the touch screen devices 168, a plurality of selection keys 172 is generated as softkeys for selecting one or more of the plurality of output channels 126,128,130,132,133. A talk button as another command key can also be provided at the control command generation means to control the opening or closing of a specific input channel 112,114,116,118,120,122. A control command generated by this talk button can as well be transmitted via the internal bus system 135. In cases in which a touch screen or a softkey cannot be used, the touch screen can be replaced by any other kind of command generation means.

By this arrangement an operator located at an operator stand 170 is enabled to select one or more output channels 126,128,130,132,133 as receivers for the speech message input via the microphone 160 located at the same operator stand 170. For example, a main operator at a main operator stand 170 may select another operator stand, for example, a pump operator stand or a turnable ladder operator stand by pressing one of the softkeys 172 of the respective touch screen device 168, to open the respective speech output channel leading to this target operator stand 170, so that a speech message from the main operator stand 170 can be routed to the other operator stand 170. Of course this routing of a speech message is possible in the opposite direction. In particular a routing of such a speech message is possible from one operator stand 170 to a plurality of operator stands 170, for example, from the main operator stand to all remaining operator stands 170 of the vehicle, and also including routing to an external radio transmission apparatus 164 via the interface 162 of the output channel 133. The routing of a pre-fabricated voice message stored in the memory 150 can also be initialized by pressing a respective softkey 172, as well as the generation of a signal by the signal generating means.

By pressing the selection key 172, a control command is generated within the touch screen device 168, which is transmitted via the internal bus system 135 to the microcontroller 166. The microcontroller 166 controls the interface router 124 according to the received control command to perform the routing between the input channels 112,114, 116,118,120,122 and the output channels 126,128,130,132, 133, including the mixing of different input channels 112, 114,116,118,120,122 and to transmit the result to one output channel or a plurality of output channels 126,128,130,132, 133.

The microcontroller 166 is further provided for controlling each of the preamplifiers 140 of the speech input channels 112,114,116,118,120,122. In the present embodiment, the microcontroller 166 is provided to receive corresponding preamplification control commands generated by the touch screen devices 168 as a reaction to the input of an operator via softkeys 172. Thus an operator is able to choose a level of amplification of one input channel 112,114,116, 118,120,122 by a corresponding input to the touch screen device 168, to generate a respective control command to be transferred via the internal bus system 135 to the microcontroller 166. According to another embodiment, the microcontroller 166 controls the amplification level of the input channels 112,114,116,118,120,122 individually according to predefined amplification factors stored within the microcontroller 166. Moreover, in the present embodiment, the microcontroller 166 is provided to receive amplification control commands for controlling the amplification of the amplifiers 146 within the output channels 126,128,130,132 according to amplification control commands generated by the command generation means and transmitted via the internal bus system 135. Thus it is possible to control the amplification of an amplifier 146 of an arbitrary output channel 126,128, 130,132 from a remote operator stand 170.

It is noted that the touch screen device 168 shown in FIG. 2 can be replaced by another input device, which may also comprise hardkeys or softkeys 172 with a programmable function, or other hardware input means.

Moreover, the CAN bus used as the internal bus system 135 in FIG. 2 can be replaced by an Ethernet bus system, or another suitable transmission standard bus system.

The invention claimed is:

1. Communication system of a rescue vehicle, comprising a plurality of speech input channels and a plurality of speech output channels, wherein each of the input channels and output channels operates in a particular signal transmission mode, and an interface router connecting the plurality of speech input channels and the plurality of speech output channels in a way that each of the plurality of speech input channels can be linked to communicate with a plurality of the speech output channels at the same time irrespective of a compatibility between the respective signal transmission modes of the input channel and the output channel, wherein two or more of the input channels comprise a microphone as a speech input source, with different microphones being located at different operator stands of the rescue vehicle, and wherein the speech output channels are located at different operator stands of the rescue vehicle, and further comprising, at each of the operator stands, at least one selection key, the at least one selection key of each of the operator stands being operable by the operator for selecting one or more output channels as receivers for a speech message inputted via the microphone located at the respective operator stand, so that said speech message is routed to the selected one or more output channels corresponding to other operator stands irrespective of whether another speech message inputted via a microphone at another operator stand is simultaneously being routed to one or more of the same selected one or more output channels by operation of the at least one selection key of the another operator stand.

2. Communication system according to claim 1, wherein each of the input channels comprises a preamplifier to preamplify analog signals from the respective microphone and an analog/digital (A/D) converter to convert preamplified analog signals issued from the preamplifier to be input into the interface router.

3. Communication system according to claim 2, wherein the microcontroller is provided for controlling the preamplifiers of the speech input channels.

4. Communication system according to claim 2, further comprising a microcontroller for controlling the interface router, wherein the microcontroller is provided for controlling the preamplifiers of the speech input channels, wherein the interface router is connected to an internal bus system of the vehicle and the communication system further comprises microcontroller for controlling the interface router, connected to the internal bus system for receiving control commands transmitted via the internal bus system and wherein the communication system further comprises control command generation means connected to the internal bus system, with different control command generation means being located at different operator stands of the rescue vehicle and wherein the control command generation means comprise the at least one selection key for selecting one or more of the plurality of output channels.

5. Communication system according to claim 1, wherein the transmission mode is a signal transmission protocol for coding/encoding signal data.

6. Communication system according to claim 1, wherein the transmission mode is related either to analog signal transmission or to digital signal transmission.

7. Communication system according to claim 1, wherein the transmission mode is related to a communication hardware signal transmission channel.

8. Communication system according to claim 1, wherein the transmission mode is related to internal vehicle communication or external vehicle communication.

9. Communication system according to claim 1, wherein the interface router is a programmable integrated circuit.

10. Communication system according to claim 1, wherein the interface router is connected to an internal bus system of the vehicle.

11. Communication system according to claim 1, further comprising a microcontroller for controlling the interface router.

12. Communication system according to claim 1, wherein the interface router is connected to an internal bus system of the vehicle and the communication system further comprises microcontroller for controlling the interface router connected to the internal bus system for receiving control commands transmitted via the internal bus system.

13. Communication system according to claim 12, comprising control command generation means connected to the internal bus system, with different control command generation means being located at different operator stands of the rescue vehicle.

14. Communication system according to claim 13, wherein the control command generation means comprise the at least one selection key for selecting one or more of the plurality of output channels.

15. Communication system according to claim 1, further comprising a memory for storing messages, connected to the output channels by the interface router such that a message stored in the memory can be output via one or more output channels.

16. Communication system according to claim 1, further comprising a memory for recording and storing communication content exchanged via the interface router.

17. Communication system according to claim 1, further comprising a signal generator connected to the output channels by the interface router such that a signal generated by the signal generator can be output via one or more output channels.

18. Communication system according to claim 1, further comprising noise cancellation means for cancelling a noise content within the communication content exchanged via the interface router.

19. Communication system according to claim 1, wherein each of the input channels is chosen from one or more of the following group:
a radio transmission channel on a determined radio transmission frequency or frequency band;
a telephone transmission channel;
a vehicle internal communication channel;
a vehicle external communication channel;
an internet protocol transmission channel,
wherein each of the above group may be a wire-bound or wireless channel.

20. Communication system according to claim 1, wherein each of the output channels is chosen from one or more of the following group:
a radio transmission channel on a determined radio transmission frequency or frequency band;
a telephone transmission channel;
a vehicle internal communication channel;
a vehicle external communication channel;
an internet protocol transmission channel,
wherein each of the above group may be a wire-bound or wireless channel.

21. Communication system according to claim 1, wherein at least one of the output channels comprises an interface for connecting an external radio transmission apparatus to the interface router.

22. Communication system according to claim 1, wherein at least one of the input channels comprises an interface for connecting an external radio transmission apparatus to the interface router.

* * * * *